(12) United States Patent
Mathew et al.

(10) Patent No.: US 8,170,356 B2
(45) Date of Patent: May 1, 2012

(54) LINEAR TEMPORAL REFERENCE SCHEME HAVING NON-REFERENCE PREDICTIVE FRAMES

(75) Inventors: Manu Mathew, Ernakulam (IN); Soyeb Nagori, Bangalore (IN); Pramod Kumar Swami, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 1056 days.

(21) Appl. No.: 12/060,887

(22) Filed: Apr. 2, 2008

(65) Prior Publication Data

US 2009/0252426 A1 Oct. 8, 2009

(51) Int. Cl.
*G06K 9/36* (2006.01)
(52) U.S. Cl. ........................................ 382/238
(58) Field of Classification Search .......... 382/232, 382/236, 238–239, 248, 250–253; 375/240.02–240.03, 240.12–240.22; 348/394.1, 348/400.1–416.1
See application file for complete search history.

(56) References Cited

U.S. PATENT DOCUMENTS

| 7,042,941 B1 * | 5/2006 | Laksono et al. | 375/240.03 |
| 7,391,809 B2 * | 6/2008 | Li et al. | 375/240.12 |

* cited by examiner

*Primary Examiner* — Jose Couso
(74) *Attorney, Agent, or Firm* — John Lawrence Maxin; Wade J. Brady, III; Frederick J. Telecky, Jr.

(57) ABSTRACT

The method, system, and apparatus of linear temporal reference scheme having non-reference predictive frames is disclosed. In one embodiment, a method of a temporal reference scheme includes creating a non-reference predictive frame and a reference predictive frame from a reference frame, increasing a quantization factor of the non-reference predictive frame by a threshold value, and decreasing the quantization factor of the reference predictive frame by the threshold value. The method may include toggling between the temporal reference scheme and another temporal reference scheme in which there may be no non-reference predictive frames and only reference predictive frames based on a scenario. The method may also include calculating a target bit rate across a communication channel through a bit rate calculation algorithm that considers a bandwidth capacity across the communication channel.

15 Claims, 11 Drawing Sheets

LINEAR TEMPORAL REFERENCE SCHEME HAVING NON-REFERENCE PREDICTIVE FRAMES

FIELD OF TECHNOLOGY

This disclosure relates generally to an enterprise method, a technical field of software and/or hardware technology and, in one example embodiment, to linear temporal reference scheme having non-reference predictive frames.

BACKGROUND

A video data may be encoded for a variety of reasons. For example, the video data may be encoded to provide accurate transmission of the video data across a communication medium (e.g., Internet). The video data may be compressed through the encoding through an application of a predictive frame creation process, in which frames of a stream of the video data reference other frames having similar properties in the stream.

The predictive frame creation process may encode data non-linearly, meaning that future frames may need to be encoded prior to previous frames (e.g., when a bidirectional predictive frame methodology is used). This may introduce delays that make it difficult to transmit the video data when it is duplex communication (e.g., video conferencing). Furthermore, both frames that serve as references to other frames and frames which do not serve as references to other frames may apply a similar quantization coefficient to compress data. Therefore, bits may be wasted on frames that do not help to create new frames.

SUMMARY

The method, system, and apparatus of linear temporal reference scheme having non-reference predictive frames is disclosed. In one aspect, a method of a temporal reference scheme (e.g., may be applied in a H.264 baseline profile encoder in applications may include real-time streaming communication such as video conferencing and/or applications requiring low power) includes creating a non-reference predictive frame and a reference predictive frame from a reference frame, increasing a quantization factor of the non-reference predictive frame by a threshold value, and decreasing the quantization factor of the reference predictive frame (e.g., may be used to improve quality of the reference predictive frame because the reference predictive frame creates other new predictive frame) by the threshold value.

The method may include toggling between the temporal reference scheme and another temporal reference scheme in which there may be no non-reference predictive frames and reference predictive frames based on a scenario (e.g., may include a fast-motion scenario and/or a scene-change scenario). The method may also include calculating a target bit rate across a communication channel through a bit rate calculation algorithm that considers a bandwidth capacity across the communication channel. In addition, the method may modify the quantization factor so that an observed bit rate of the temporal reference scheme gets closer to the target bit rate by comparing a target number of bits of a group of frames sharing the reference frame (e.g., may be calculated from the target bit rate divided by a frame per second of the temporal reference scheme to calculate a target bits per frame, and then multiplying the target bits per frame by any number of frames in the group) with the observed number of bits.

The method may include achieving the target bit rate when the another temporal reference scheme in which there may be no non-reference predictive frames and the reference predictive frames is used by comparing a number of bits of a previous reference predictive frame with the target bits per frame. The method may create multiple new frames from the reference predictive frame to form a hierarchy in which intermediary predictive reference frames in the hierarchy have quantization factors between that of primary predictive reference frames and non-reference predictive frames. In addition, the method may also include applying the temporal reference scheme when a predominant motion between frames may be lower than a calculated value.

The method may group motion vectors of the frame of subsequent frames into a low motion group and a high motion group. The method may calculate an average of an absolute value motion vector of the high motion group if the high motion group covers a significant portion of frame of the subsequent frames; and using an average of absolute motion vector as the predominant motion between frames.

The method may insert an intra reference frame when a scene change may be detected in a current frame. The method may place intra macro-blocks at periodic intervals to minimize transmission errors. The method may avoid placement of forced intra macro-blocks in the non-reference predictive frame and reapplying saved intra macro-blocks in the reference predictive frame in proportion to ones not forced into the non-reference predictive frame. The method may place forced intra macro-blocks at periodic intervals to minimize transmission errors.

The method may include scaling a motion vector of a last non-reference predictive frame to a current reference predictive frame so that a scaled (e.g., doubled) motion factor may serve as a starting factor in determining a motion vector of the current frame. The method may also include avoiding reconstruction of the non-reference predictive frame because it may not be used in constructing other frames. The method may follow a linear encoding and decoding path (e.g., no frames are skipped before they are encoded, and decoded through the temporal reference scheme).

In another aspect, a temporal reference scheme includes an intra-frame, a set of reference predictive frames that are created from the intra-frame, in which certain ones of the set of reference predictive frames reference the intra-frame while others reference intermediate reference predictive frames of the set of reference predictive frames, and a set of non-reference predictive frames having a quantization factor that may be higher than the set of reference predictive frames.

The higher quantization factor of the non-reference predictive frames may be used to permit additional bits that can be allocated to the reference predictive frames through lower quantization factors because the reference predictive frames may be used to create new predictive frames. A target bit rate may be calculated across a communication channel through a bit rate calculation algorithm that considers a bandwidth capacity across the communication channel. The quantization factor may be modified so that an observed bit rate of the temporal reference scheme gets closer to the target bit rate by comparing a target number of bits of a group of frames sharing a reference frame with observed number of bits for the group of frames. The target number of bits of the group of frames sharing the reference frame may be calculated from the target bit rate divided by a frame per second of the temporal reference scheme to calculate a target bits per frame, and then multiplying the target bits per frame by a number of frames in the group.

In yet another aspect, a system includes an encoder module (e.g., may be a H.264 baseline profile encoder used in applications including real-time streaming communication such as video conferencing and/or applications requiring low power) having temporal reference scheme in which a set of non-reference predictive frames have a quantization factor that may be higher than reference predictive frames, and a decoder module to decode data having the temporal reference scheme and to determine whether to switch to a different reference scheme based on a scenario represented in subsequent frames.

There may be no non-reference predictive frames and the reference predictive frames in the different reference scheme based on the scenario. The scenario may include a fast-motion scenario and a scene-change scenario.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

The method, system, and apparatus of linear temporal reference scheme having non-reference predictive frames is disclosed. Although the present embodiments have been described with reference to specific example embodiments, it will be evident that various modifications and changes may be made to these embodiments without departing from the broader spirit and scope of the various embodiments.

Figure 1:
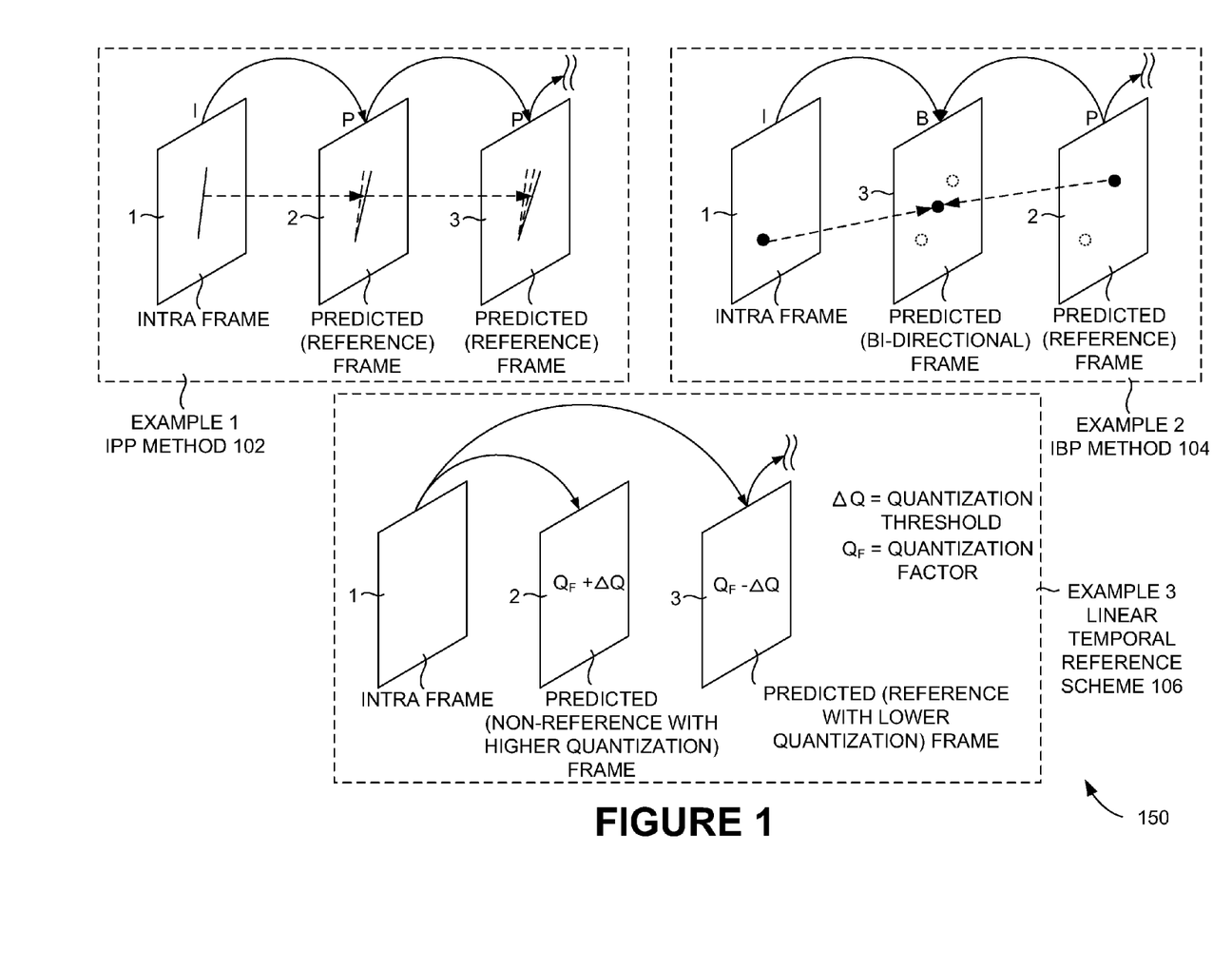
FIG. 1 is an example view illustrating different methods for constructing predictive frames along with the temporal reference scheme method, according to one embodiment.

In one embodiment, a method of a temporal reference scheme includes creating a non-reference predictive frame (e.g., non-reference P frame) and a reference predictive frame (e.g., reference P frame) from a reference frame, increasing a quantization factor of the non-reference predictive frame by a threshold value (e.g., $Q_F+\Delta Q$ as illustrated in FIG. 1), and decreasing the quantization factor of the reference predictive frame by the threshold value (e.g., $Q_F-\Delta Q$ as illustrated in FIG. 1).

In another embodiment, a temporal reference scheme includes an intra-frame (e.g., I frame), a set of reference predictive frames (e.g., P frames) that are created from the intra-frame (e.g., I frame), in which certain ones of the set of reference predictive frames reference the intra-frame while others reference intermediate reference predictive frames of the set of reference predictive frames, and a set of non-reference predictive frames having a quantization factor (e.g., $Q_F$ illustrated in FIG. 1) that is higher than the set of reference predictive frames.

Figure 5:
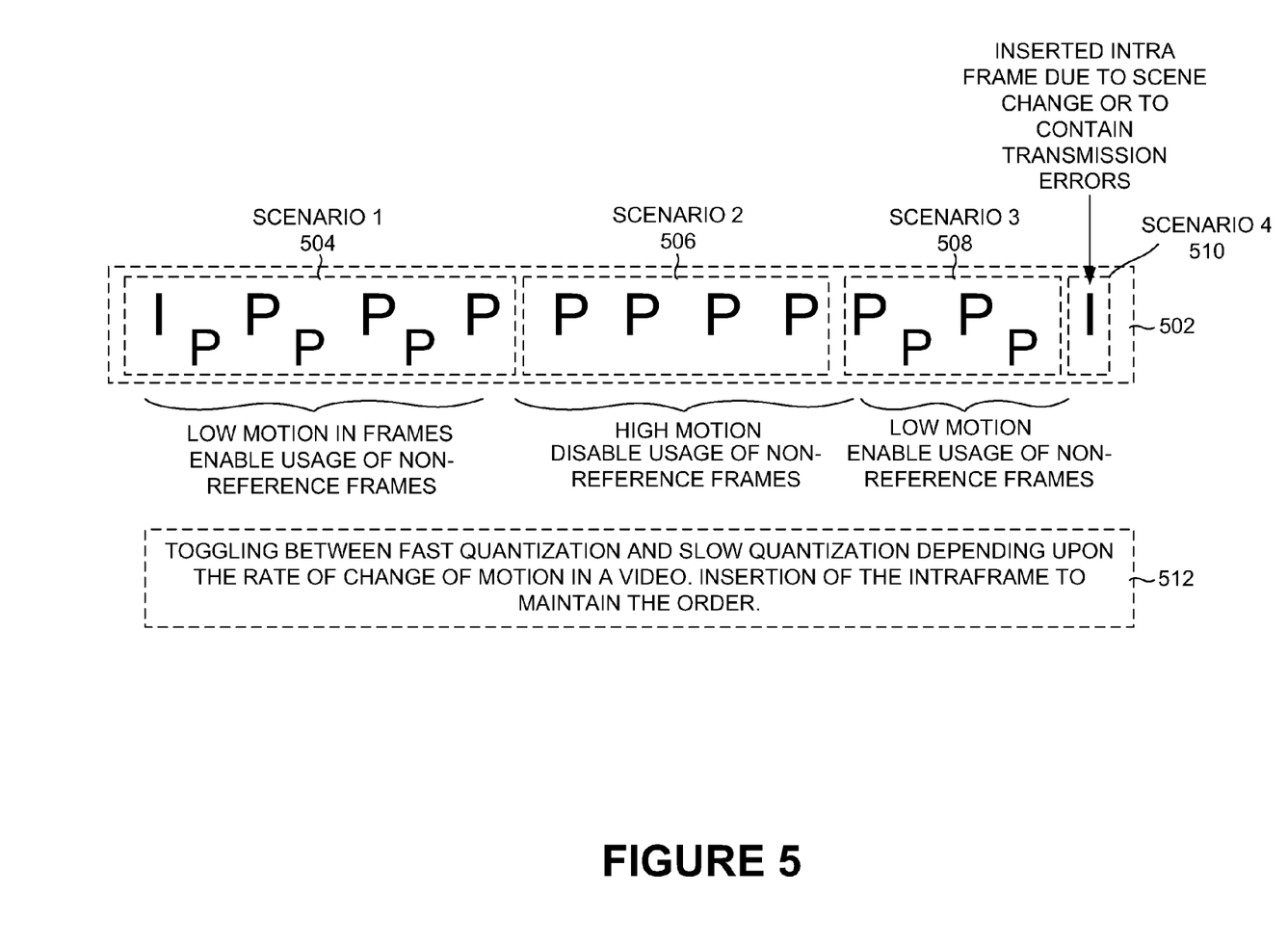
FIG. 5 illustrates toggling between different temporal reference schemes based on rate of motion in frames, according to one embodiment.
Figure 6:
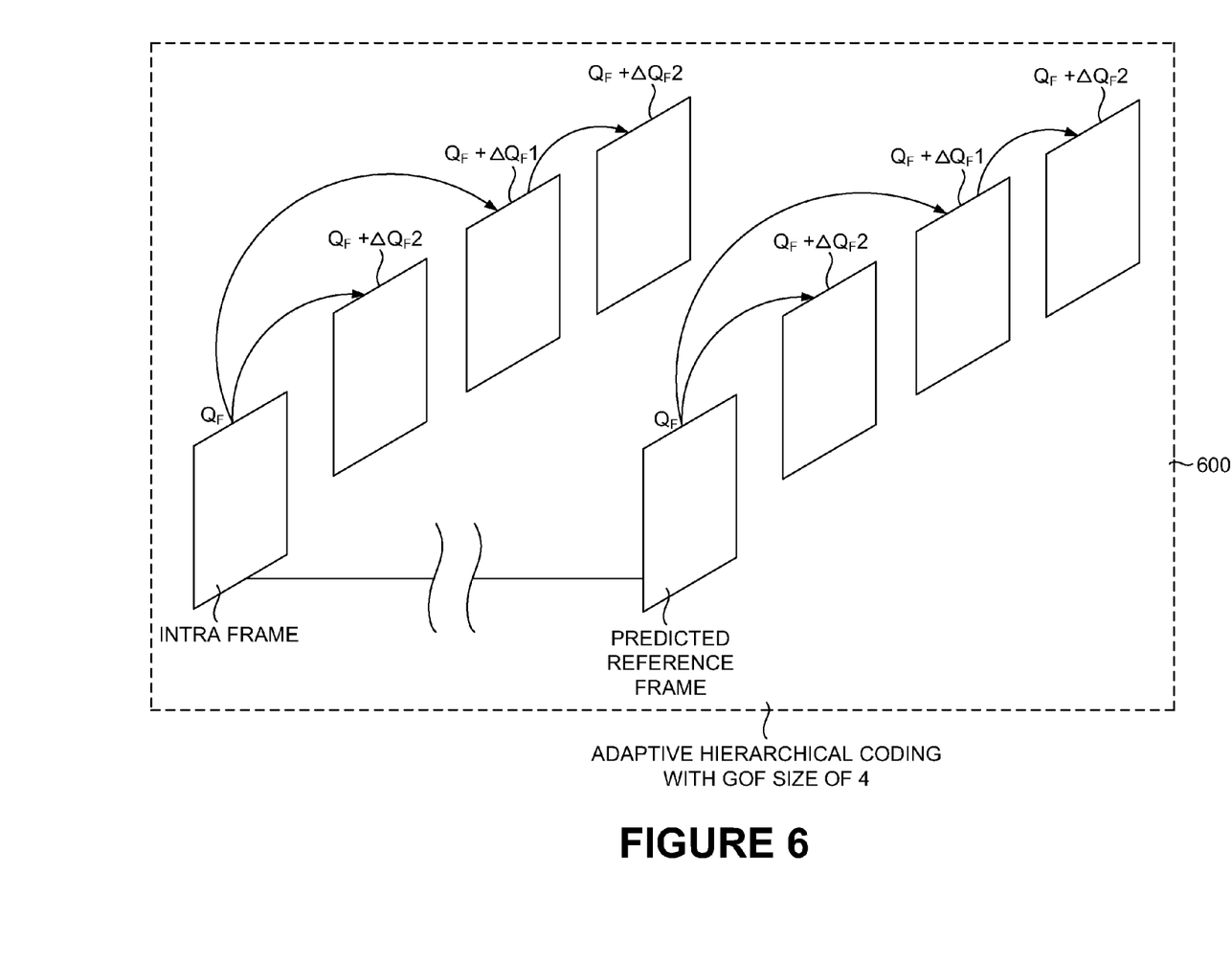
FIG. 6 illustrates adaptive hierarchical coding with GOF size of 4, according to one embodiment.

In yet another embodiment, a system includes an encoder module (e.g., the encoder module 302 of FIG. 3) having temporal reference scheme in which a set of non-reference predictive frames (e.g., non-reference P frames as illustrated in FIG. 6) have a quantization factor (e.g., $Q_F$ as illustrated in FIG. 1) that is higher than reference predictive frames (e.g., as illustrated in FIG. 6), and a decoder module (e.g., the decoder module 304 of FIG. 3) to decode data having the temporal reference scheme and to determine whether to switch to a different reference scheme based on a scenario represented in subsequent frames (e.g., as illustrated in FIG. 5).

FIG. 1 is an example view illustrating different methods for constructing predictive frames (e.g., P frames) along with a temporal reference scheme method, according to one embodiment. Particularly, the example 1 IPP (e.g., predictive) method 102 for construction of predictive reference frames, the example 2 IBP (e.g., bi-directional predictive) method for construction of predictive bi-directional frame and the example 3 linear temporal reference scheme 106 method for construction of predictive non-reference frame with higher quantization factor, and predictive reference frame with lower quantization factor.

The example 1 IPP method 102 may describe an IPP (e.g., a predictive method) where reference predictive frames (e.g., P frames) are constructed from a past frame (e.g., previous reference predictive frames, or using an intra frame in case of first reference predictive frame) from an intra-frame (e.g., I frame). The example 2 IBP method 104 may describe an IBP method where bi-directional frames (e.g., B frames) are constructed using past frames (e.g., may include P frames or intra frame in case of first predictive frame) and a future frame. The example 3 linear temporal reference scheme 106 may describe construction of non-reference predictive frames and/or reference predictive frames using reference frames (e.g., predictive reference frame or intra frame in case of first predictive frame).

Figure 2:
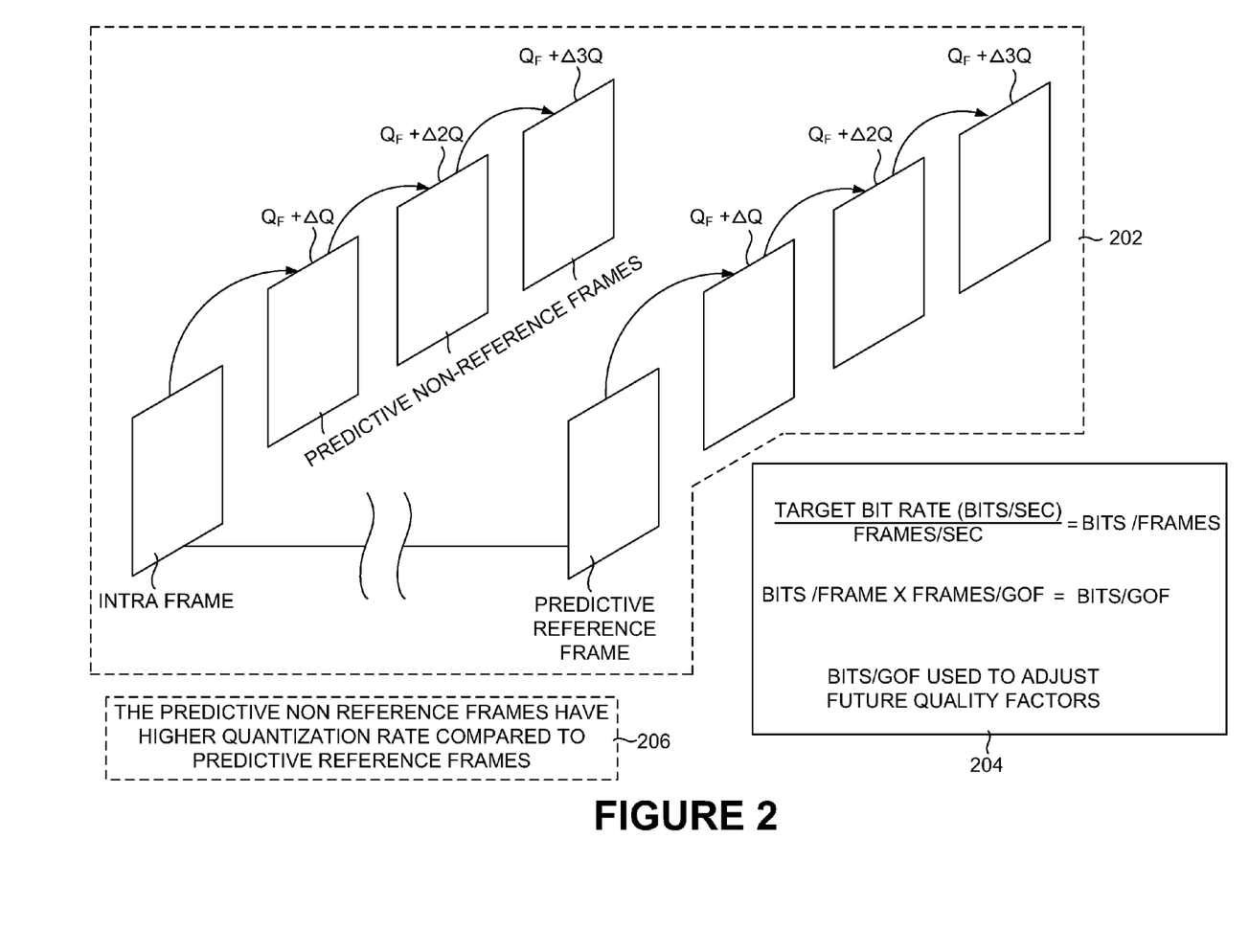
FIG. 2 illustrates constructing predictive frames using temporal reference scheme method, according to one embodiment.

FIG. 2 illustrates constructing predictive frames using temporal reference scheme method, according to one embodiment. Particularly, FIG. 2 illustrates a block 202, a block 204, and a block 206, according to one embodiment.

The block 202 may illustrate construction of the reference predictive frames and non-reference predictive frames. The first reference predictive frame (e.g., P frame) with low quantization factor may be constructed from the intra frame (e.g., I frame) and predictive reference frames with low quantization factor other than the first predictive frame may be constructed from reference predictive frames with lower quantization factor. The non-reference predictive frames with higher quantization factor may be constructed from the predictive reference frame with lower quantization factor and from intra frame (e.g., I frame) in case reference frame is intra frame. The non-reference predictive frames with higher quantization factor may be constructed from non-reference predictive frames having lower quantization factor.

The block 204 may illustrate bits/group of frames (GOF) for adjustment of future quality factors derived using target bit rate (e.g., bits/sec) divided by frames/second which leads to bits/frames and multiplying bits/frame by frames/GOF leading to bits/GOF. The block 206 states that the predictive non-reference frames may have higher quantization rate compared to reference predictive frames.

In example embodiment, FIG. 2 illustrates the block 202 which shows construction of predictive frames (e.g., reference predictive frames and non-reference predictive frames) beginning from the intra frame. The block 204 illustrates calculation for bits/GOF for adjusting future quality factors. The block 206 discusses the different quantization rates for predictive frames (e.g., reference predictive frames and non-reference predictive frames).

In one embodiment, the target number of bits in the group of frames sharing the reference frame (e.g., as illustrated in FIG. 6) may be calculated from the target bit rate divided by a frame per second of the temporal reference scheme to calculate a target bits per frame. The target bits per frame may be multiplied by a number of frames in the group (e.g., as illustrated in block 204 of FIG. 2). A set of reference predictive frames may be created from the intra-frame, in which certain ones of the set of reference predictive frames reference an intra-frame (e.g., I frame) while others reference intermediate reference predictive frames of the set of reference predictive frames (e.g., as illustrated in FIG. 2). A set of non-reference predictive frames may have a quantization factor that is higher than the set of reference predictive frames (e.g., as illustrated in FIG. 2). The higher quantization factor of the non-reference predictive frames may be used to permit additional bits that can be allocated to the reference predictive frames through lower quantization factors because the reference predictive frames may be used to create new predictive frames (e.g., as illustrated in FIG. 2).

A target bit rate may be calculated across a communication channel through a bit rate calculation algorithm that considers a bandwidth capacity across the communication channel (e.g., as illustrated in block 204 of FIG. 2). The quantization factor may be modified so that an observed bit rate of the temporal reference scheme gets closer to the target bit rate by comparing a target number of bits of a group of frames sharing a reference frame with observed number of bits for the group of frames (e.g., as illustrated in FIG. 6). The target number of bits of the group of frames sharing the reference frame may be calculated from the target bit rate divided by a frames per second of the temporal reference scheme to calculate a target bits per frame (e.g., as illustrated in FIG. 2 and FIG. 6) and then may be multiplied the target bits per frame by a number of frames in the group (e.g., as illustrated in FIG. 2).

Figure 3:
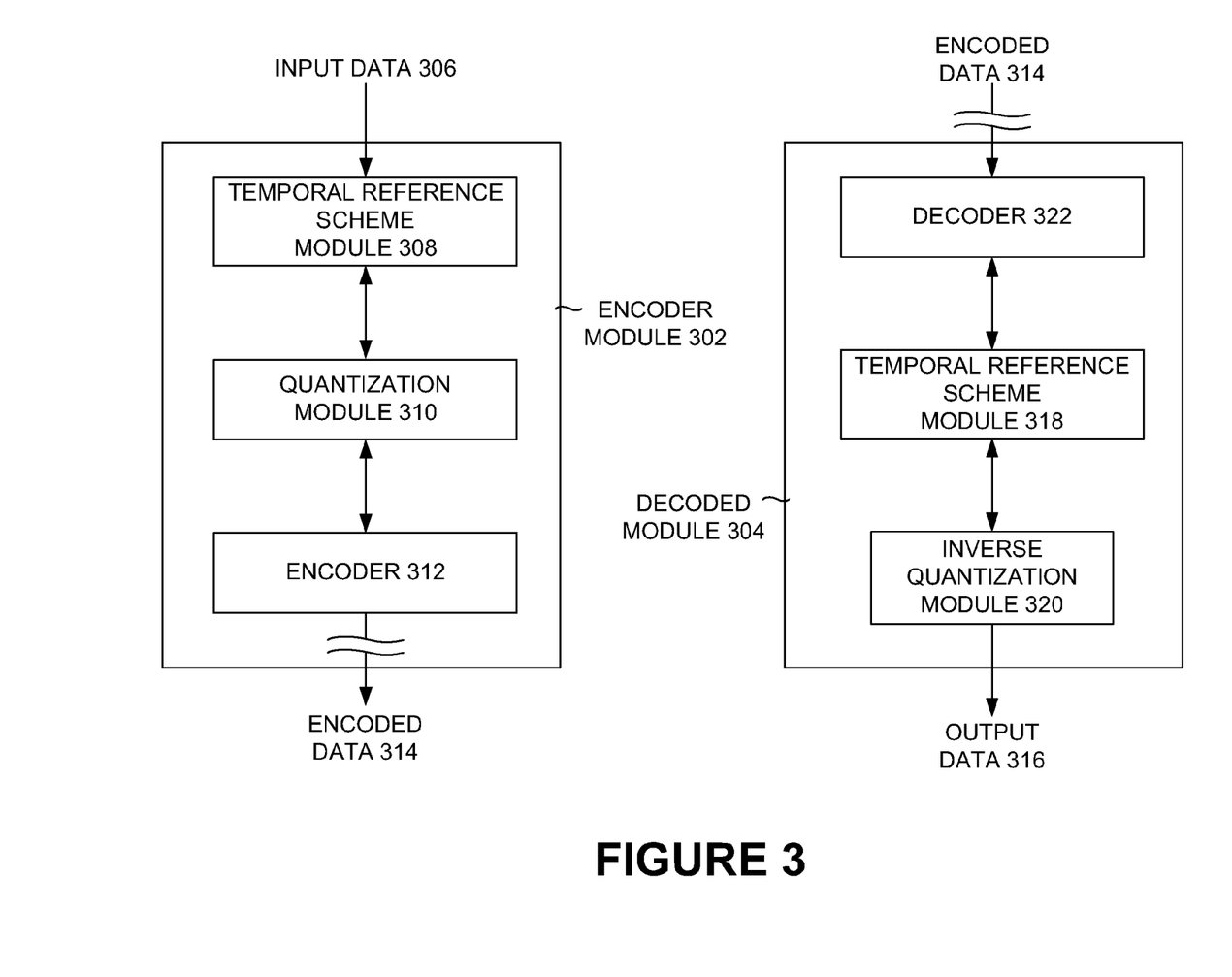
FIG. 3 illustrates encoding and decoding operation using various modules, according to one embodiment.

FIG. 3 illustrates encoding and decoding operation using various modules, according to one embodiment. Particularly, FIG. 3 illustrates an encoder module 302, a decoder module 304, an input data 306, a temporal reference scheme module 308, a quantization module 310, an encoder 312, an encoded data 314, an output data 316, a temporal reference scheme module 318, an inverse quantization module 320, and the decoder 322, according to one embodiment.

The encoder module 302 may have temporal reference scheme which may determine on quantization factor for set of non-reference predictive frames (e.g., higher quantization) and for reference predictive frames (e.g., lower quantization). The decoder module 304 may have the temporal reference scheme to determine switching to different reference schemes on subsequent frames based on different scenarios. The input data 306 may be a set of frames input to the encoder module 302 for encoding. The temporal reference scheme module 308 of encoder module 302 may decide on different quantization factors for different predictive frames (e.g., reference predictive frames and non-reference predictive frames).

The quantization module 310 may perform quantization on frames (e.g., reference predictive frames and non-reference predictive frames) based temporal reference scheme. For example, reference predictive frames may have lower quantization compared to non-reference predictive frames. The encoder 312 may encode the input data 306 which has been quantized from the quantization module 310. The encoded data 314 may be an encoded output from the encoder module 302. The output data 316 may be a set of frames almost similar to that of input data 306.

The temporal reference scheme module 318 of decoder module 304 may determine switching different reference schemes for subsequent frames based on different scenarios. The inverse quantization module 320 may apply an inverse quantization algorithm on the encoded data 314 to get back the original data. The decoder 322 may decode the encoded data 314 for further operations.

In example embodiment, the encoder module 302 may include the temporal reference scheme module 308, the quantization module 310, and the encoder 312, according to one embodiment. The encoder module 302 may take the input data 306 and may give encoded data 314 as the output. The decoder module 304 may include the decoder 322, the temporal reference scheme module 318, and the inverse quantization module 320, according to one embodiment. The decoder module 304 may take ion the encoded data 314 as input and may provide the output data 316 as output.

In one embodiment, a non-reference predictive frame and a reference predictive frame may be created from a reference frame (e.g., using the temporal reference scheme module 308 of FIG. 3). A quantization factor of the non-reference predictive frame may be increased by a threshold value (e.g., using the temporal reference scheme module 308 of FIG. 3). The quantization factor of the reference predictive frame may be decreased by the threshold value (e.g., using the temporal reference scheme module 308 of FIG. 3). The decreased quantization factor of the reference predictive frame may be used to improve quality of the reference predictive frame because the reference predictive frame creates other new predictive frame (e.g., using the temporal reference scheme module 308 of FIG. 3).

The encoder module 302 may be a H.264 baseline profile encoder used in applications may include real-time streaming communication (e.g., video conferencing and applications requiring low power).

An encoder module (e.g., the encoder module 302 of FIG. 3) may have temporal reference scheme (e.g., in the temporal reference scheme module 308 of FIG. 3) in which a set of non-reference predictive frames have a quantization factor that higher than reference predictive frames (e.g., as illustrated in FIG. 6). A decoder module (e.g., the decoder module 304 of FIG. 3) may decode data having the temporal reference scheme (e.g., in the temporal reference scheme module 318 of FIG. 3) and to determine whether to switch to a different reference scheme based on a scenario represented in subsequent frames (e.g., as illustrated in FIG. 5).

Figure 4:
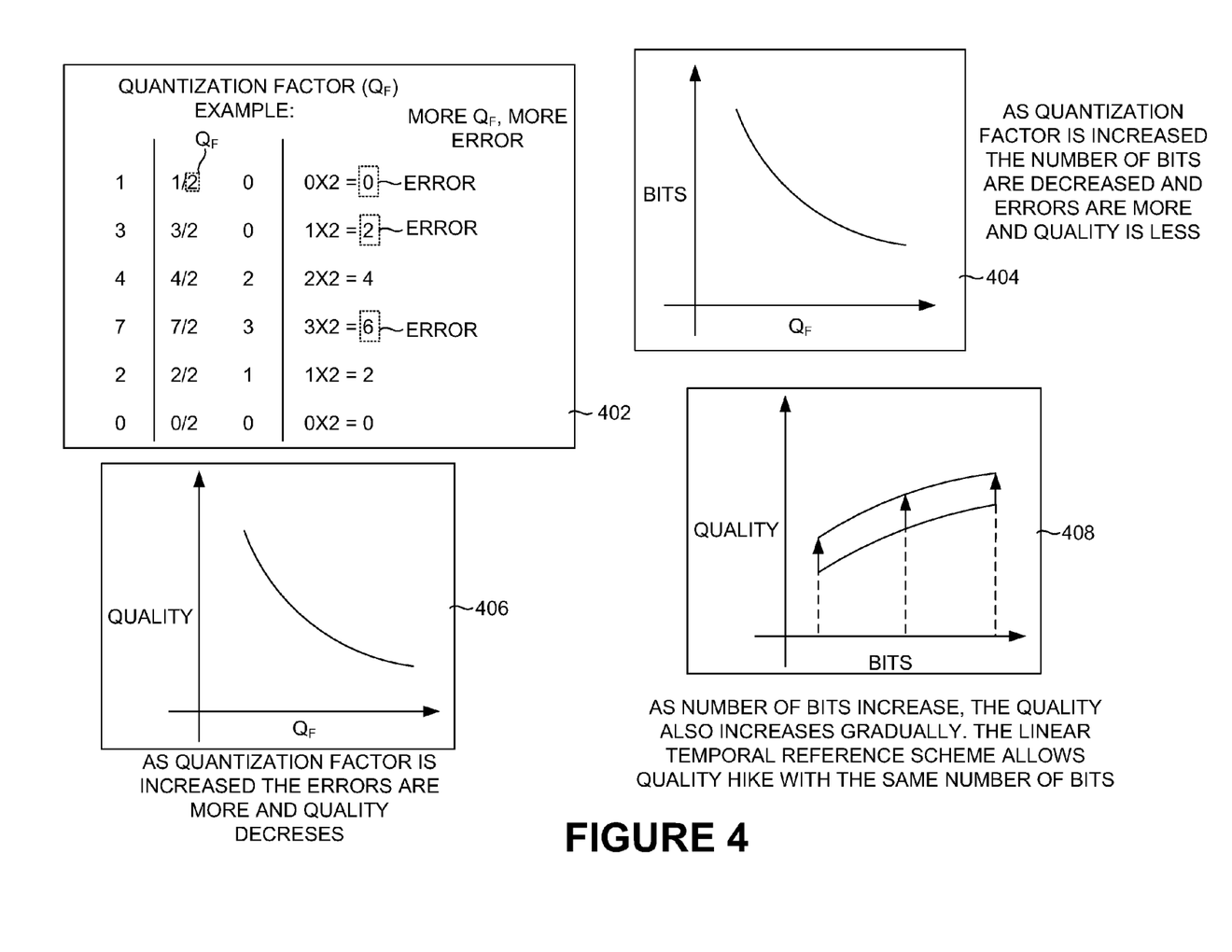
FIG. 4 is an example view of quantization factor and a graphical view illustrating comparison of various parameters, according to one embodiment.

FIG. 4 is an example view of quantization factor and a graphical view illustrating comparison of various parameters, according to one embodiment. Particularly, FIG. 4 illustrates a quantization factor example 402, an example graph of bits vs. $Q_F$ 404, an example graph of quality vs. $Q_F$ 406, and an example graph of quality vs. bits 408, according to one embodiment.

The quantization factor example 402 may illustrate an example of quantization of input and possible errors that may occur during quantization. Higher the quantization factor, higher the possibility of the errors. The example graph of bits vs. $Q_F$ 404 may illustrate bits vs. quantization factor ($Q_F$). As the quantization factor ($Q_F$) increases the number of bits may decrease, the possibility of errors may be more and the quality may decrease. The example graph of quality vs. $Q_F$ 406 may illustrate quality vs. quantization factor ($Q_F$). As the quantization factor increases, the possibility of errors may be more and quality may decrease. The example graph of quality vs. bits 408 may illustrate quality vs. bits. As the number of bits increases the quality may also increase. The linear temporal reference scheme may allow improvement in quality with the same number of bits.

In example embodiment, FIG. 4 illustrates the use of quantization factor ($Q_F$) example 402, the example graph 404, the example graph 406 and the example graph 408 illustrating various comparisons between the quality, quality factor ($Q_F$) and in number of bits in form of graphs.

FIG. 5 illustrates toggling between different temporal reference scheme based on rate of motion in frames, according to one embodiment. Particularly, FIG. 5 illustrates frames 502, a scenario 1 504, a scenario 2 506, a scenario 3 508, a scenario 4 510, and block 512, according to one embodiment.

The frames 502 may be a set of frames (e.g., intra frames, non-reference predictive frames and reference predictive frames. The scenario 1 504 may illustrate slow motion in frames that may enable temporal reference scheme to add non-reference frames in between the reference predictive frames. The scenario 2 506 may illustrate fast motion in frames that may enable temporal reference scheme to disable addition of non-reference frames in between the reference predictive frames. The scenario 3 508 may again illustrate slow motion in frames. The scenario 4 510 may illustrates the use of intra frame during scene changing scenario and/or to contain transmission errors. The block 512 states about toggling between different temporal reference schemes based on change of predominant motion in subsequent frames.

In example embodiment, FIG. 5, illustrates frames 502, scenario 1 504 about the slow motion in frames, scenario 2 506 about the fast motion in frames, scenario 3 508 about slow motion in frames, scenario 4 510 about insertion of intra frame for scene change scenario and/or for containing transmission errors.

In one embodiment, the temporal reference scheme and another temporal reference scheme may be toggled based on a scenario (e.g., as illustrated in FIG. 5). The target bit rate may be achieved when the another temporal reference scheme in which there may be no non-reference predictive frames and reference predictive frames may be used by comparing a number of bits of a previous reference predictive frame with the target bits per frame (e.g., as illustrated in FIG. 5). The scenario may include a fast-motion scenario and/or a scene-change scenario (e.g., as illustrated in FIG. 5). The temporal reference scheme may be applied when motion between frames may be lower than a calculated value based on an absolute motion of a predominant motion present in a frame of subsequent frames (e.g., as illustrated in scenario 1, 504 of FIG. 5). Motion vectors of the frame of subsequent frames may be grouped into a low motion group and a high motion group (e.g., as illustrated in scenario 2 506, scenario 3 508 of FIG. 5). An average motion vector of the high motion group (e.g., as illustrated in scenario 2 506 of FIG. 5) may be calculated if the high motion group (e.g., as illustrated in scenario 2 506 of FIG. 5) covers a significant portion of frame of the subsequent frames.

An intra reference frame may be inserted when a scene change may be detected in a current frame (e.g., as illustrated in scenario 4 of FIG. 5). Intra macro-blocks may be placed at periodic intervals to minimize transmission errors (e.g., using the inserted intra frame to contain transmission errors 510 of FIG. 5). The placement of forced intra macro-blocks may be avoided in the non-reference predictive frame. Saved intra macro-blocks in the reference predictive frame may be re applied in proportion to the ones not forced into the non-reference predictive frame. Forced intra macro blocks may be placed at periodic intervals to minimize transmission errors (as illustrated in FIG. 5). A motion vector of a last non-reference predictive frame may be scaled to a current reference predictive frame so that a scaled motion factor may serve as a starting factor in determining a motion vector of the current frame (e.g., as illustrated in FIG. 5).

Reconstruction of the non-reference predictive frame may be avoided because it may not be used in constructing other frames. A linear encoding and decoding path may be followed (e.g., no frames may be skipped before they are encoded and decoded through the temporal reference scheme).

FIG. 6 illustrates adaptive hierarchical coding with GOF size of 4, according to one embodiment. Particularly, FIG. 6 illustrates adaptive hierarchical coding 600, according to one embodiment.

The adaptive hierarchical coding 600 illustrates hierarchical coding with GOF of size 4. The FIG. 6 illustrates deriving non-reference predictive frames from reference predictive frame and from intra frame when there is no reference predictive frame. The non-reference predictive frames may have higher quantization factor (e.g., $Q_F+\Delta Q_F X$) compared to reference predictive frames. The FIG. 6 illustrates different levels of generating non-reference predictive frames from reference predictive and intra frames.

In one embodiment, the multiple new frames may be created from the reference predictive frame to form a hierarchy in which intermediary predictive reference frames in the hierarchy have quantization factors between that of primary predictive reference frames and non-reference predictive frames (e.g., using adaptive hierarchical coding with GOF size of 4, 600 of FIG. 6).

Figure 7:
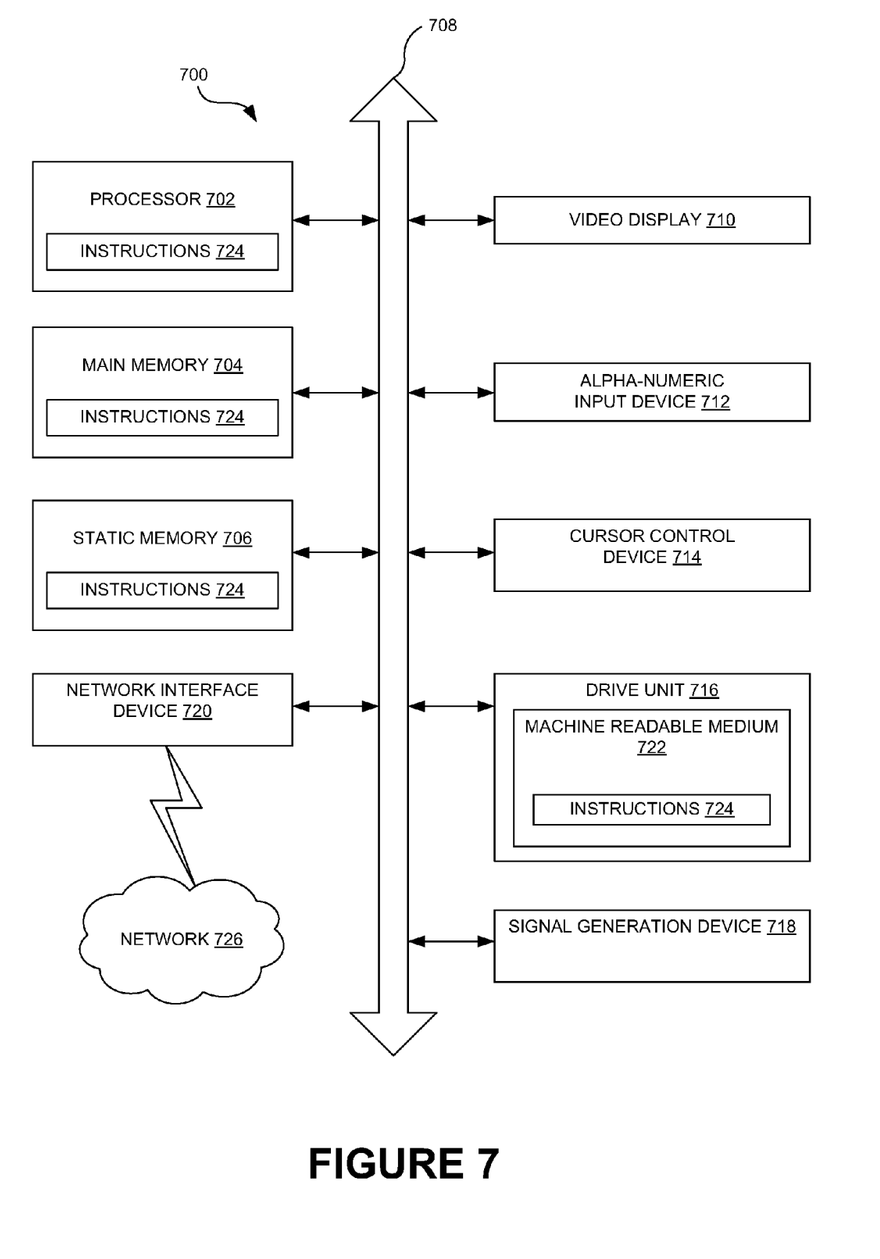
FIG. 7 is a diagrammatic system view of a data processing system in which any of the embodiments disclosed herein may be performed, according to one embodiment.

FIG. 7 is a diagrammatic system view of a data processing system in which any of the embodiments disclosed herein may be performed, according to one embodiment. Particularly, the diagrammatic system view 700 of FIG. 5 illustrates a processor 702, a main memory 704, a static memory 706, a bus 708, a video display 710, an alpha-numeric input device 712, a cursor control device 714, a drive unit 716, a signal generation device 718, a network interface device 720, a machine readable medium 722, instructions 724, and a network 726, according to one embodiment.

The diagrammatic system view 700 may indicate a personal computer and/or the data processing system in which one or more operations disclosed herein are performed. The processor 702 may be a microprocessor, a state machine, an application specific integrated circuit, a field programmable gate array, etc. (e.g., Intel® Pentium® processor). The main memory 704 may be a dynamic random access memory and/or a primary memory of a computer system.

The static memory 706 may be a hard drive, a flash drive, and/or other memory information associated with the data processing system. The bus 708 may be an interconnection between various circuits and/or structures of the data processing system. The video display 710 may provide graphical representation of information on the data processing system. The alpha-numeric input device 712 may be a keypad, a keyboard and/or any other input device of text (e.g., a special device to aid the physically handicapped).

The cursor control device 714 may be a pointing device such as a mouse. The drive unit 716 may be the hard drive, a storage system, and/or other longer term storage subsystem. The signal generation device 718 may be a bios and/or a functional operating system of the data processing system. The network interface device 720 may be a device that performs interface functions such as code conversion, protocol conversion and/or buffering required for communication to and from the network 726. The machine readable medium 722 may provide instructions on which any of the methods disclosed herein may be performed. The instructions 724 may provide source code and/or data code to the processor 702 to enable any one or more operations disclosed herein.

Figure 8A:
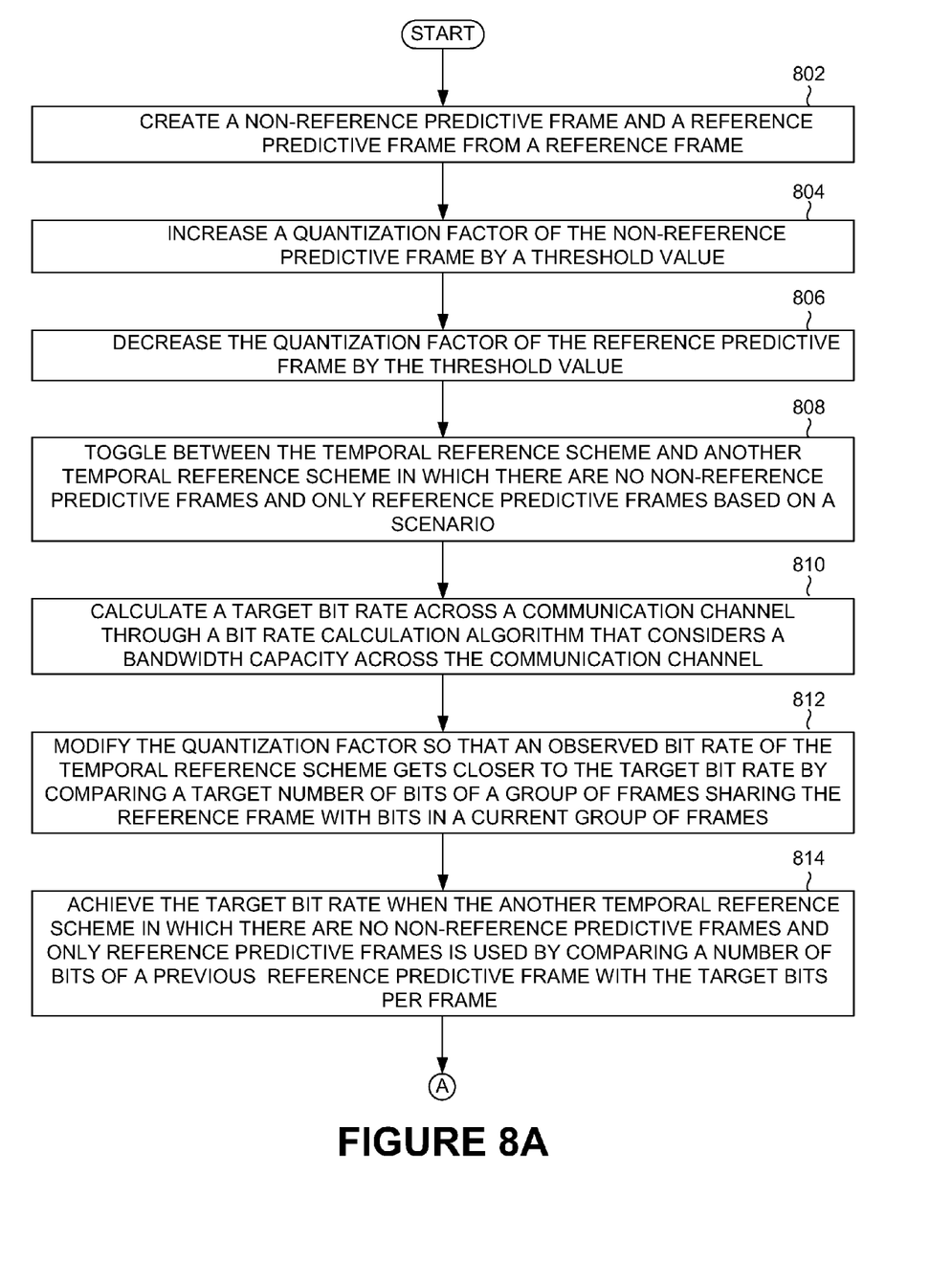
FIG. 8A is a process flow of modifying quantization factor of quantization so that an observed bit rate of temporal reference scheme gets closer to target bit rate, according to one embodiment.

FIG. 8A is a process flow of modifying a quantization factor of quantization so that an observed bit rate of temporal reference scheme gets closer to target bit rate, according to one embodiment. In operation 802, a non-reference predictive frame (e.g., non-reference P frame) and a reference predictive frame (e.g., reference P frame) may be created from a reference frame (e.g., using the temporal reference scheme module 308 of FIG. 3). In operation 804, a quantization factor (e.g., $Q_F$ as illustrated in FIG. 1) of the non-reference predictive frame may be increased by a threshold value (e.g., $Q_F+\Delta Q$ as illustrated in FIG. 1) using the temporal reference scheme. In operation 806, the quantization factor of the reference predictive frame may be decreased by the threshold value (e.g., $Q_F-\Delta Q$ as illustrated in FIG. 1) (e.g., using the temporal reference scheme module 308 of FIG. 3).

The decreased quantization factor of the reference predictive frame may be used to improve quality of the reference predictive frame because the reference predictive frame creates the other new predictive frame (e.g., using the temporal reference scheme). In operation 808, the temporal reference scheme and another temporal reference scheme may be toggled (e.g., using the temporal reference scheme module 308 of FIG. 3) in between in which there may be no non-reference predictive frames and reference predictive frames based on a scenario (e.g., as illustrated in FIG. 5). The scenario may include a fast-motion scenario and/or a scene-change scenario (e.g., as illustrated in FIG. 5).

In operation 810, a target bit rate may be calculated across a communication channel through a bit rate calculation algorithm that considers a bandwidth capacity across the communication channel (e.g., as illustrated in block 204 of FIG. 2). In operation 812, the quantization factor may be modified so that an observed bit rate of the temporal reference scheme gets closer to the target bit rate by comparing a target number of bits of a group of frames sharing the reference frame with the observed number of bits (e.g., as illustrated in FIG. 6).

The target number of bits in the group of frames sharing the reference frame may be calculated from the target bit rate divided by a frames per second of the temporal reference scheme to calculate a target bits per frame (e.g., using the target bit rate calculation algorithm). The target bits per frame may be multiplied by a number of frames in the group (e.g., as illustrated in block 204 of FIG. 2).

Figure 8B:
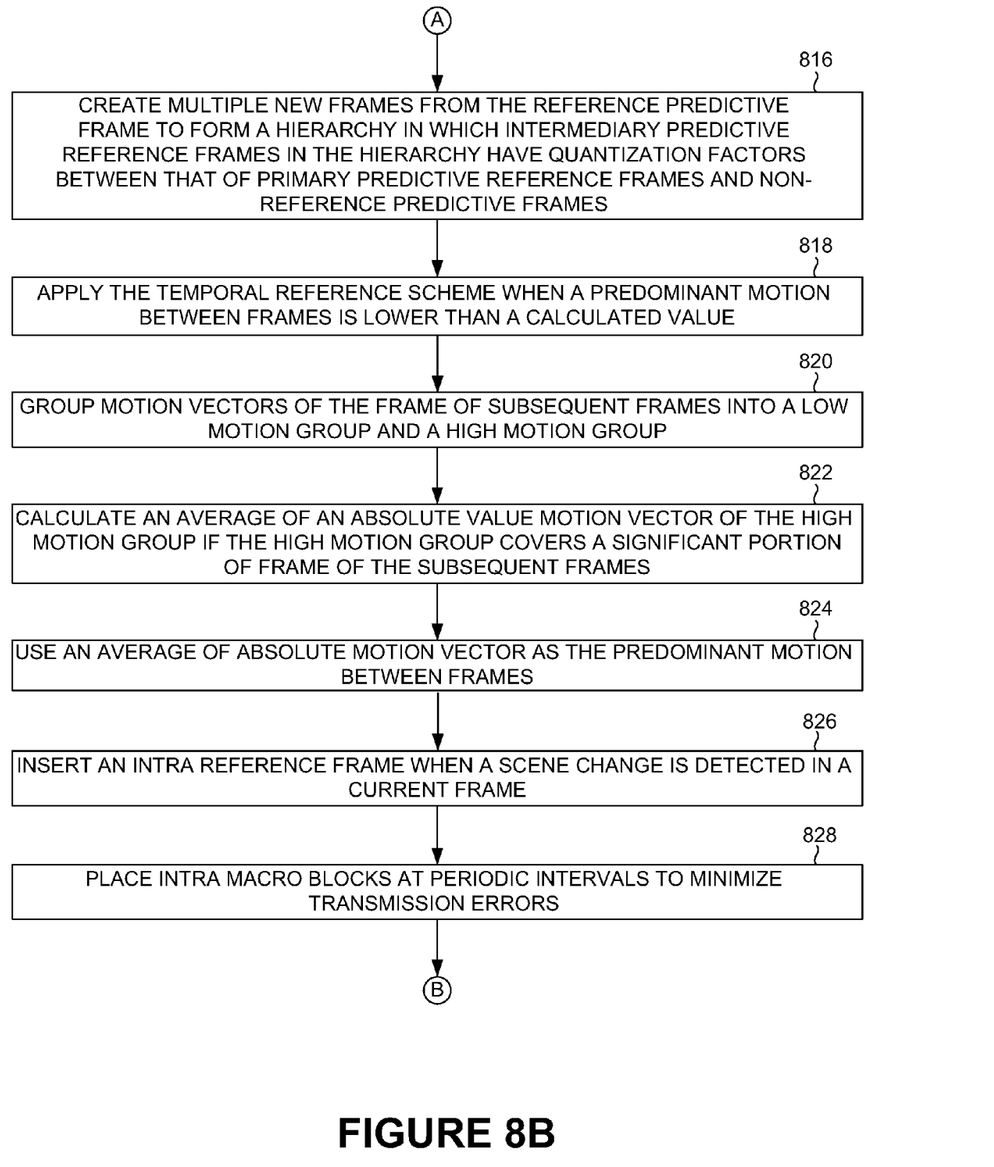
FIG. 8B is a continuation of process flow of FIG. 8A, illustrating additional processes, according to one embodiment.

FIG. 8B is a continuation of process flow of FIG. 8A, illustrating additional processes, according to one embodiment. In operation 814, the target bit rate may be achieved when the another temporal reference scheme in which there may be no non-reference predictive frames and reference predictive frames is used by comparing a number of bits of a previous reference predictive frame with the target bits per frame (e.g., illustrated in the example graph 408 of FIG. 4). In operation 816, multiple new frames may be created from the reference predictive frame to form a hierarchy (e.g., using the adaptive hierarchical coding with GOF size of 4, 600 of FIG. 6) in which intermediary predictive reference frames in the hierarchy have quantization factors between that of primary predictive reference frames and non-reference predictive frames (e.g., as illustrated in FIG. 6).

In operation 818, the temporal reference scheme may be applied when a predominant motion between frames is lower than a calculated value (e.g., as illustrated in FIG. 5). In operation 820, motion vectors of the frame of subsequent frames may be grouped into a low motion group and a high motion group using adaptive hierarchical coding (e.g., as illustrated as scenario 1, scenario 2 and scenario 3, of FIG. 5). In operation 822, an average of an absolute value motion vector of the high motion group (e.g., as illustrated in scenario 2, 506 of FIG. 5) may be calculated if the high motion group covers a significant portion of frame of the subsequent frames (e.g., using the temporal reference scheme). In operation 824, the average of the absolute motion vector may be used as the predominant motion vector frames. In operation 826, an intra reference frame may be inserted (e.g., illustrated as scenario 4 510 of FIG. 5) when a scene change may be detected in a current frame (e.g., using adaptive hierarchical coding).

Figure 8C:
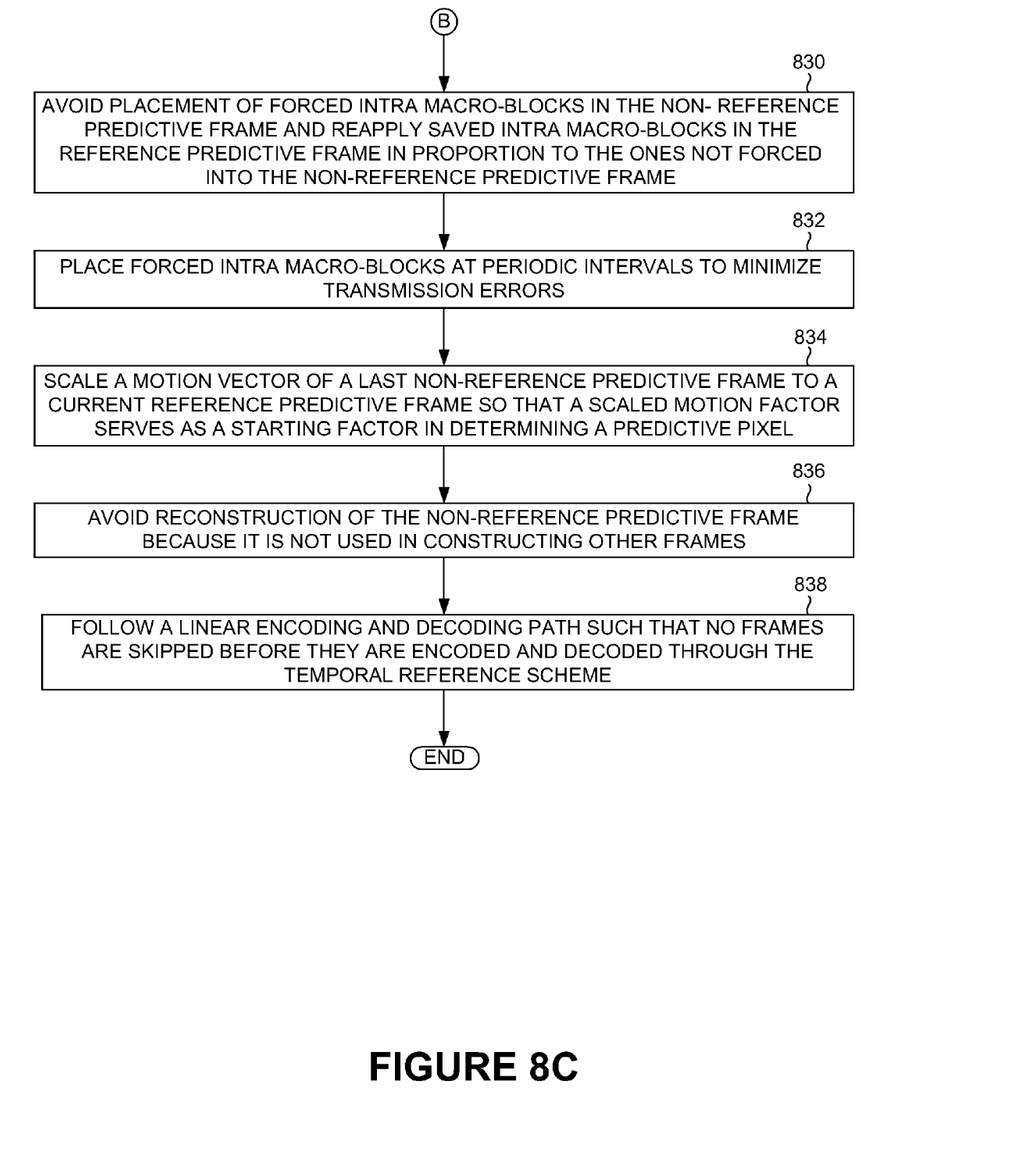
FIG. 8C is a continuation of process flow of FIG. 8B, illustrating additional processes, according to one embodiment.

FIG. 8C is a continuation of process flow of FIG. 8B, illustrating additional processes, according to one embodiment. In operation 828, intra macro-blocks may be placed at periodic intervals to minimize transmission errors (e.g., as illustrated in FIG. 5). In operation 830, placement of forced intra macro-blocks may be avoided in the non-reference predictive frame and saved intra macro-blocks in the reference predictive frame may be re-applied in proportion to the ones not forced into the non-reference predictive frame. In operation 832, the forced intra macro blocks may be placed at periodic intervals to minimize transmission errors (e.g., illustrated in scenario 4 510 of FIG. 5).

In operation 834, a motion vector of a last non-reference predictive frame may be scaled to a current reference predictive frame so that a scaled motion factor serves as a starting factor in determining a motion vector of the current frame. In operation 836, reconstruction of the non-reference predictive frame may be avoided because it may not be used in constructing other frames. In operation 838, a linear encoding and decoding path may be followed (e.g., no frames may be skipped before they are encoded and decoded through the temporal reference scheme) (e.g., using temporal reference scheme). The temporal reference scheme may be applied in a H.264 baseline profile encoder in applications may include real-time streaming communication (e.g., a video conferencing and/or applications requiring low power).

Figure 9:
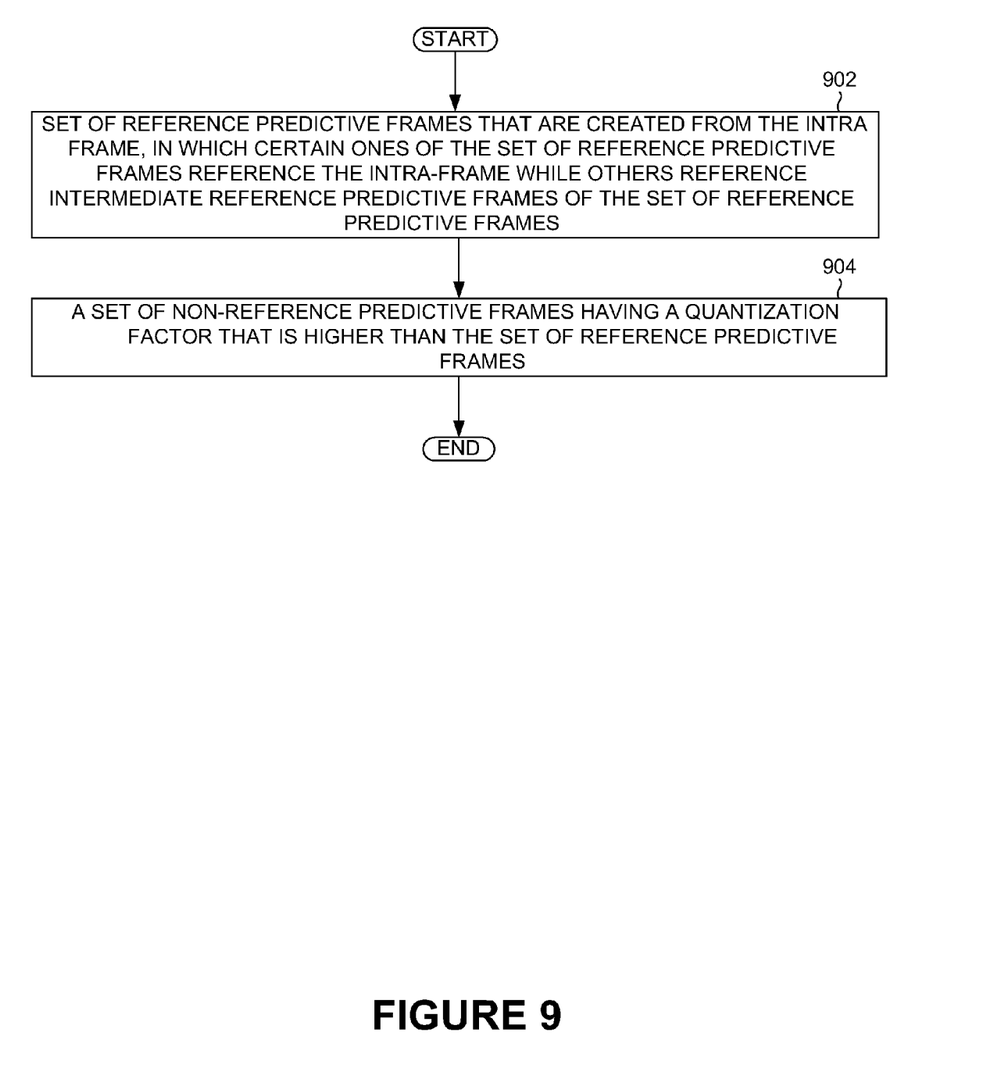
FIG. 9 is a process flow of creating a set of reference predictive frames from a intra-frame, according to one embodiment.

FIG. 9 is a process flow of creating a set of reference predictive frames from a intra-frame, according to one embodiment. In operation 902, a set of reference predictive frames that may be created (e.g., using the temporal reference scheme) from the intra-frame (e.g., in which certain ones of the set of reference predictive frames reference the intra-frame while others reference intermediate reference predictive frames of the set of reference predictive frames). In operation 904, a set of non-reference predictive frames may have a quantization factor that may be higher than the set of reference predictive frames (e.g., as illustrated in FIG. 2). The higher quantization factor of the non-reference predictive frames may be used to permit additional bits that can be allocated to the reference predictive frames through lower quantization factors because the reference predictive frames may be used to create new predictive frames (e.g., as illustrated in FIG. 2). A target bit rate may be calculated across a communication channel through a bit rate calculation algorithm that considers a bandwidth capacity across the communication channel (e.g., as illustrated in FIG. 2).

The quantization factor may be modified so that an observed bit rate of the temporal reference scheme gets closer to the target bit rate by comparing a target number of bits of a group of frames sharing a reference frame with observed number of bits for the group of frames (e.g., as illustrated in FIG. 6). The target number of bits of the group of frames sharing the reference frame may be calculated from the target bit rate divided by a frames per second of the temporal reference scheme to calculate a target bits per frame and then may be multiplied by the target bits per frame by a number of frames in the group (e.g., as illustrated in FIG. 2).

Particularly, the encoder module 302, the decoder module 304, the temporal reference scheme module 308, the quantization module 310, the temporal reference scheme module 318, and the inverse quantization module 320 of FIGS. 1-9 may be enabled using software and/or using transistors, logic gates, and electrical circuits (e.g., application specific integrated ASIC circuitry) such as a encoder circuit, a decoder circuit, a temporal reference scheme circuit, a quantization circuit, a temporal reference scheme circuit, and an inverse quantization circuit of FIG. 1-9, and other circuit.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method of a temporal reference scheme in a data processing system comprising:
    creating a non-reference predictive frame and a reference predictive frame from a reference frame;
    increasing a quantization factor of the non-reference predictive frame by a threshold value;
    decreasing the quantization factor of the reference predictive frame by the threshold value to improve quality of the reference predictive frame because the reference predictive frame creates at least one other new predictive frame; and
    toggling between the temporal reference scheme and another temporal reference scheme in which there are no non-reference predictive frames and only reference predictive frames based on a scenario, wherein the scenario includes a fast-motion scenario and a scene-change scenario.

2. The method of claim 1 further comprising:
    calculating a target bit rate across a communication channel through a bit rate calculation algorithm that considers a bandwidth capacity across the communication channel; and
    modifying the quantization factor so that an observed bit rate of the temporal reference scheme gets closer to the target bit rate by comparing a target number of bits of a group of frames sharing the reference frame with the observed number of bits.

3. The method of claim 2 wherein the target number of bits in the group of frames sharing the reference frame is calculated from the target bit rate divided by a frames per second of the temporal reference scheme to calculate a target bits per frame, and then multiplying the target bits per frame by a number of frames in the group.

4. The method of claim 3 further comprising: achieving the target bit rate when the another temporal reference scheme in which there are no non-reference predictive frames and only reference predictive frames is used by comparing a number of bits of a previous reference predictive frame with the target bits per frame.

5. The method of claim 2 further comprising:
    creating multiple new frames from the reference predictive frame to form a hierarchy in which intermediary predictive reference frames in the hierarchy have quantization factors between that of primary predictive reference frames and non-reference predictive frames.

6. The method of claim 1 further comprising:
    applying the temporal reference scheme when a predominant motion between frames is lower than a calculated value.

7. The method of claim 6 further comprising:
    grouping motion vectors of the frame of subsequent frames into a low motion group and a high motion group;
    calculating an average of the absolute value motion vector of the high motion group if the high motion group covers a significant portion of frame of the subsequent frames; and
    using an average of absolute motion vector as the predominant motion between frames.

8. The method of claim 1 further comprising:
    inserting an intra reference frame when a scene change is detected in a current frame; and
    placing intra macro-blocks at periodic intervals to minimize transmission errors, avoiding placement of forced intra macro-blocks in the non-reference predictive frame and reapplying saved intra macro-blocks in the reference predictive frame in proportion to the ones not forced into the nonreference predictive frame; and placing forced intra macro-blocks at periodic intervals to minimize transmission errors.

9. The method of claim 8, further comprising scaling a motion vector of a last nonreference predictive frame to a current reference predictive frame so that the scaled motion factor serves as a starting factor in determining a motion vector of the current frame.

10. The method of claim 1 further comprising:
    avoiding reconstruction of the non-reference predictive frame because it is not used in constructing other frames;
    following a linear encoding and decoding path such that no frames are skipped before they are encoded and decoded through the temporal reference scheme.

11. The method of claim 10 wherein the temporal reference scheme is applied in a H.264 baseline profile encoder in applications including real-time streaming communication such as video conferencing and applications requiring low power.

12. A temporal reference scheme in a data processing system comprising:
    an intra-frame;
    a set of reference predictive frames that are created from the intra-frame, in which certain ones of the set of reference predictive frames reference the intra-frame while others reference intermediate reference predictive frames of the set of reference predictive frames; and a set of non-reference predictive frames having a quantization factor that is higher than the set of reference predictive frames wherein the higher quantization factor of the non-reference predictive frames is used to permit additional bits that can be allocated to the reference predictive frames through lower quantization factors because the reference predictive frames are used to create new predictive frames and wherein a target bit rate is calculated across a communication channel through a bit rate calculation algorithm that considers a bandwidth capacity across the communication channel, and wherein the quantization factor is modified so that an observed bit rate of the temporal reference scheme gets closer to the target bit rate by comparing a target number of bits of a group of frames sharing a reference frame with observed number of bits for the group of frames.

13. A system comprising:

an encoder module having temporal reference scheme in which a set of nonreference predictive frames have a quantization factor that is higher than reference predictive frames wherein the higher quantization factor of the non-reference predictive frames is used to permit additional bits that can be allocated to the reference predictive frames through lower quantization factors because the reference predictive frames are used to create new predictive frames; and a decoder module to decode data having the temporal reference scheme and to determine whether to switch to a different reference scheme based on a scenario represented in subsequent frames.

14. The system of claim 13 wherein there are no non-reference predictive frames and only reference predictive frames in the different reference scheme based on the scenario, wherein the scenario includes a fast-motion scenario and a scene-change scenario.

15. The system of claim 13 wherein the encoder module is a H.264 baseline profile encoder used in applications including real-time streaming communication such as video conferencing and applications requiring low power.

* * * * *